United States Patent
Sano et al.

[11] Patent Number: 6,061,778
[45] Date of Patent: May 9, 2000

[54] DIGITAL SIGNAL PROCESSOR FOR DETECTING OUT-OF-SYNC AND JITTER FROM TWO CLOCK SIGNALS AND CONTROLLING THE INTERPOLATION BASED ON DEVIATION AND JITTER AMOUNT

[75] Inventors: Hideo Sano; Shigeru Ono, both of Tokyo, Japan

[73] Assignee: NEC Corporation, Japan

[21] Appl. No.: 09/088,638

[22] Filed: Jun. 2, 1998

[30] Foreign Application Priority Data

Jun. 4, 1997 [JP] Japan ................................. 9-146694

[51] Int. Cl.[7] ....................................................... G06F 7/04
[52] U.S. Cl. ............................. 712/35; 375/226; 375/371
[58] Field of Search ................................. 712/35; 702/69; 375/226, 371, 228, 231; 370/516, 517, 518, 519; 348/497, 498, 499; 455/570, 550; 713/400; 395/800.35; 358/497

[56] References Cited

U.S. PATENT DOCUMENTS

| | | | |
|---|---|---|---|
| 3,895,186 | 7/1975 | Yoshida et al. | 358/412 |
| 4,800,571 | 1/1989 | Konishi | 375/228 |
| 5,175,746 | 12/1992 | Inoue et al. | 375/231 |
| 5,719,907 | 2/1998 | Kaku et al. | 375/371 |
| 5,923,377 | 7/1999 | Kenmochi et al. | 348/497 |
| 6,002,882 | 12/1999 | Garde | 395/800.35 |

FOREIGN PATENT DOCUMENTS

4-245728   9/1992   Japan .

OTHER PUBLICATIONS

Japanese Office Action issued Oct. 13, 1999 in a related application.
English translation of relevant portions of Oct. 13, 1999 Japanese Office Action.

*Primary Examiner*—Meng-Ai T. An
*Assistant Examiner*—Walter Benson
*Attorney, Agent, or Firm*—Ostrolenk, Faber, Gerb & Soffen, LLP

[57] ABSTRACT

Buffers 101 and 103 are provided in an input and an output of a signal processing circuit 102 for performing a data transformation between a first digital data signal and a second digital data signal, respectively, and data of one of the first and second digital data signals is interpolated by a data interpolation circuit 106 on the basis of a deviation between sampling frequencies of the first and second digital data signals detected by an out-of-sync detection circuit 104 on the basis of two clocks driving the buffers 101 and 103. Further, an amount of jitter between the two clocks driving the respective buffers 101 and 103 is detected by a jitter detection circuit 105 and the amount of interpolation data is controlled in the data interpolation circuit 106 on the basis of the amount of jitter.

4 Claims, 2 Drawing Sheets

DIGITAL SIGNAL PROCESSOR FOR DETECTING OUT-OF-SYNC AND JITTER FROM TWO CLOCK SIGNALS AND CONTROLLING THE INTERPOLATION BASED ON DEVIATION AND JITTER AMOUNT

BACKGROUND OF THE INVENTION

The present invention claims priority from Japanese Patent Application No. 9-146694 filed Jun. 4, 1997, which is incorporated herein by reference.

1. Field of the Invention

The present invention relates to a data transform between two digital data signals having different sampling frequencies. The present invention can be utilized in a digital signal communication apparatus such as a portable telephone set.

2. Description of Related Art

Japanese Patent Application Laid-open No. Hei 4-245728 discloses a digital signal processor for transforming a digital data signal having a sampling frequency into a digital data signal having a sampling frequency different from that of the original digital data signal, in which a buffer is used to perform a read and a write operations at mutually different clock frequencies, respectively. A construction of the disclosed digital signal processor is shown in FIG. 1.

The conventional digital signal processor comprises a transmission line interface circuit 201, a clock extracting circuit 202, a sync circuit 203, a buffer 204, a clock generator 205, a control clock generator circuit 206, a slip control circuit 208, a PCM-FDM transformer circuit 207, an interpolation filter circuit 209 and a re-sampling circuit 210. A time-division multiplexed PCM signal input from the PCM transmission line is input to the transmission line interface circuit 201 through a data input terminal 211. The PCM signal is transformed in the transmission line interface circuit 201 from a bipolar signal into a unipolar signal. Thereafter, the unipolar signal is frame-synchronized in the sync circuit 203 by using a clock extracted from the unipolar signal by the clock extractor circuit 202. Further, the frame synchronized unipolar signal is sampled to an N-time sampling data (8×N kHz sample) in the interpolation filter circuit 209 and output to the buffer 204. The PCM signal is written in a memory of the buffer 204 with using the clock from the clock extractor circuit 202 and the frame sync signal from the sync circuit 203. The PCM signal having sampling frequency of 8×N kHz and written in the buffer 204 is read out by using the clock output from the clock generator circuit 205 and a signal from the control clock circuit 206. Only 8 kHz sampling value of the signal thus read out is extracted by the re-sampling circuit 210. The extracted PCM signal is transformed into an FDM signal by the PCM-FDM transformer circuit 207 and then output from a data output terminal 212.

Assuming that the write speed of the PCM signal in the buffer 204 is different from the read speed thereof, that is, the write and read operations are performed with clocks having mutually different frequencies, the memory of the buffer 204 overflows or underflows, causing the so-called data slip which is drop out of the PCM signal to occur. Therefore, the slip control circuit 208 prevents overflow or underflow of the buffer memory from occurring and hence the data slip from occurring, by comparing in phase the frame sync signal from the sync circuit 203 with the frame sync signal from the control clock generator circuit 206 and stopping the write or read operation with respect to the memory of the buffer 204 for a time corresponding to one frame. Further, the data sampled at 8×N kHz is written in the buffer 204 by the interpolation filter circuit 209 and is transformed into the data sampled at 8 kHz by the re-sampling circuit 210. Therefore, even if data loss occurs due to data slip, a time deviation due to the drop out of the PCM signal is small compared with the case where the data is merely sampled at 8 kHz, and thus impulse noise is reduced.

However, when there is a jitter, that is, fluctuation of frequency, in the clock extracted by the clock extractor circuit 202 or the clock output from the control clock generator circuit 206 of the conventional system mentioned above, data in the vicinity of the timing at which data slip may occur is detected as a phase shift of the frame synchronization, on which unnecessary (erroneous) data interpolation is executed. With such unnecessary data interpolation, there may be data discontinuity or noise due to data discontinuity occurs. Particularly, in a case of narrow band signal such as sine wave signal, considerable noise may occur.

SUMMARY OF THE INVENTION

An object of the present invention is to provide a digital signal processor which, when the data interpolation is to be performed in order to prevent the data slip due to a deviation between two or more sampling frequencies from occurring, can exclude the data interpolation in the vicinity of the timing in which the data slip occurs even if there are jittered sampling frequencies, contrary to the conventional system and solve the problems of data discontinuity which is caused by such unnecessary (erroneous) data interpolation and noise due to the discontinuity of data.

In order to achieve the above object, a digital signal processor according to the present invention comprises signal processing means for transforming a first digital data signal into a second digital data signal, first buffer means driven a first clock signal for temporarily storing the first digital data signal and supplying the first digital data signal to the signal processing means, second buffer means driven by a second clock signal independent from the first clock signal for temporarily storing the second digital data signal output from the signal processing means, out-of-sync detector means for detecting, from the first and second clock signals, a deviation of sampling frequency between the first and second digital data signals, jitter detection means for detecting an amount of jitter between the first and second clock signals, and data interpolation means for interpolating data of one of the first and second digital data signals on the basis of the deviation of the sampling frequency detected by the out-of-sync detector means and controlling an amount of interpolation on the basis of the amount of jitter detected by the jitter detection means.

The data interpolation means accumulates the deviation of the sampling frequency detected by the out-of-sync detection means and does not perform data interpolation when the accumulated value is smaller than the amount of jitter and does perform data interpolation by a data amount which is a sum of the jitter amount and a data amount corresponding to one sample and initializes the accumulated value when the accumulated value is equal to or larger than the amount of jitter detected by the jitter detection means.

The out-of-sync detection means detects the phase deviation between the clocks as a deviation of the sampling frequency by counting one of the first and second clocks with an interval preset by using the other as a reference. The jitter detection circuit detects an amount of jitter by counting one of the first and second clocks with an interval preset by using the other as a reference and comparing the count with an average value of the past count for a long time.

The signal processing means, the first buffer means and the second buffer means may be bi-directionally operable to transform the first digital data signal and the second digital data signal mutually.

BRIEF DESCRIPTION OF THE DRAWINGS

The present invention will be described with reference to the accompanying drawings, in which.

DETAILED DESCRIPTION OF PREFERRED EMBODIMENTS

Figure 1:
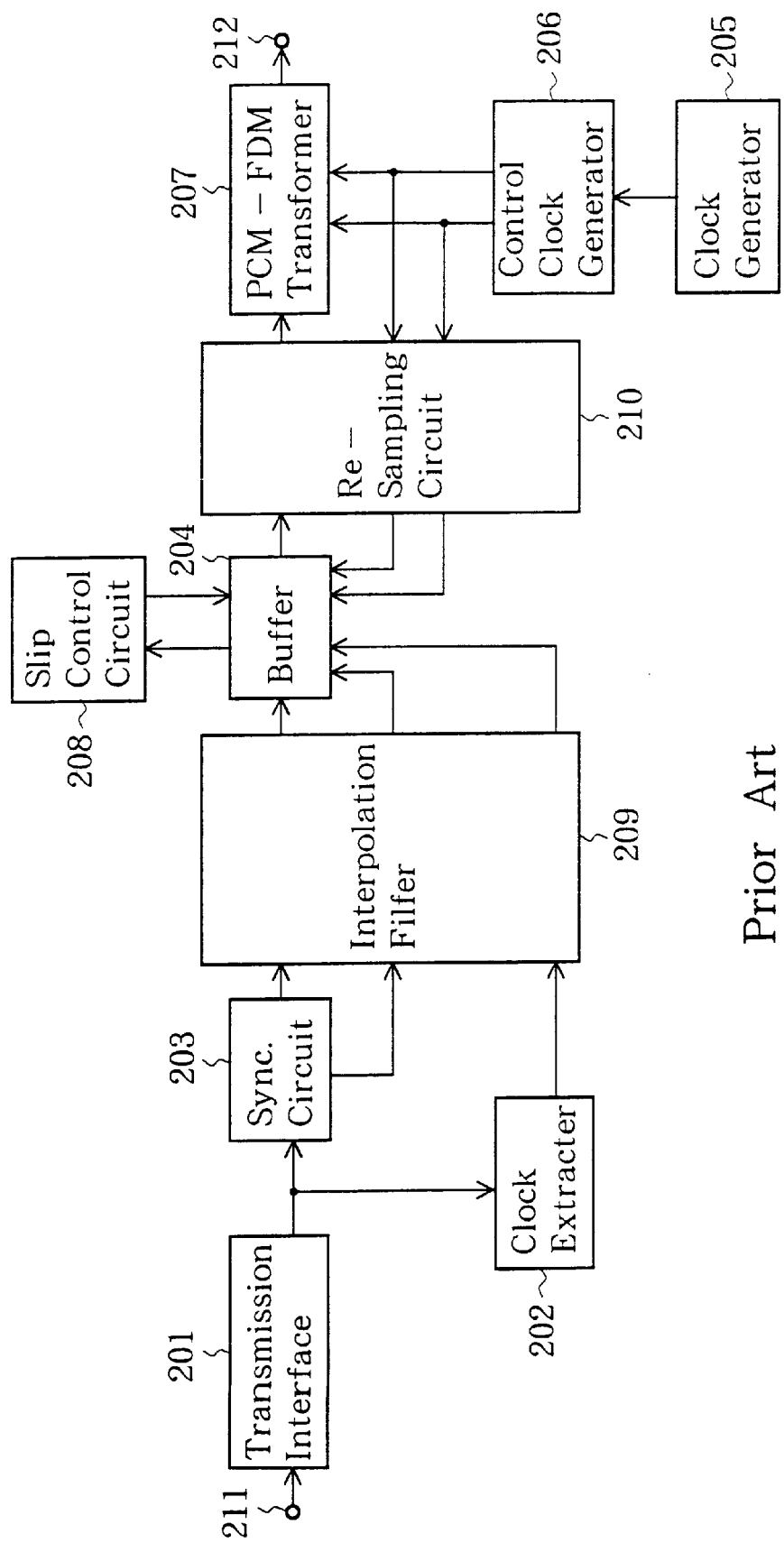
FIG. 1 is a block diagram showing a construction of a conventional digital signal processor.
Figure 2:
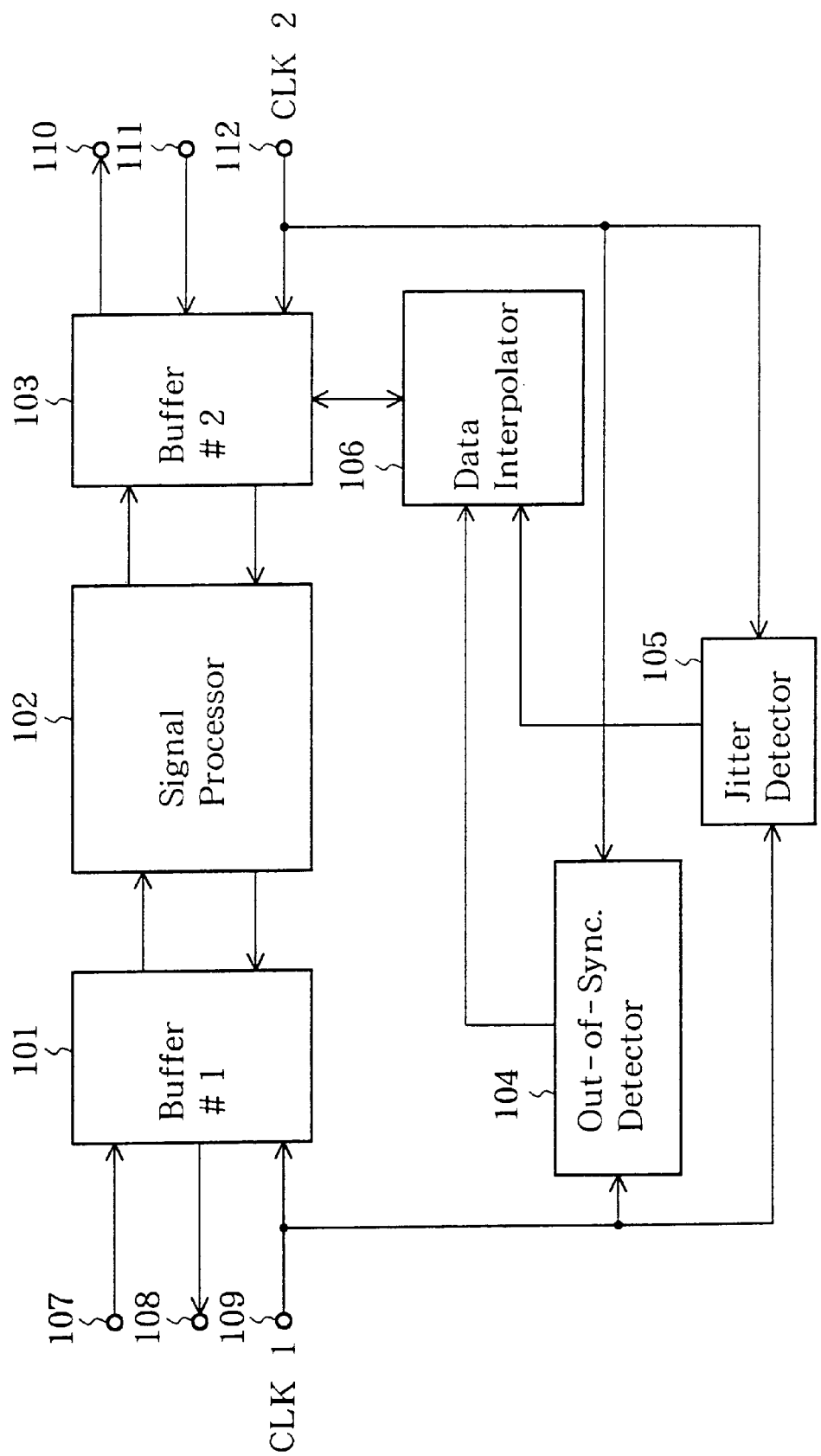
FIG. 2 is a block diagram showing a construction of a digital signal processor according to an embodiment of the present invention.

FIG. 2 is a block diagram showing an embodiment of the present invention, which corresponds to a portion of the conventional digital signal processor including the buffer 204, the PCM-FDM transformer circuit 207, the slip control circuit 208, the interpolation filter 209 and the re-sampling circuit 210 shown in FIG. 1, and capable of transforming a digital data signal bi-directionally.

The digital signal processor according to the embodiment shown in FIG. 2 comprises a signal processing circuit 102 for transforming a first digital data signal into a second digital data signal or transforming the second digital data signal into the first digital data signal, a first buffer 101 which is driven by a first, data transfer clock signal input from a clock input terminal 109 and temporarily stores the first digital data signal from a data input terminal 107 and supplies the first digital data signal to the signal processing circuit 102 and temporarily stores the digital data signal output from the signal processing circuit 101 and outputs it to a data output terminal 108, a second buffer 103 which is driven by a second, data transfer clock signal input from a clock input terminal 112 independent from the first clock signal and temporarily storing the second digital data signal output from the signal processing circuit 102 and outputs the second digital data signal to a data output terminal 110 and temporarily stores a second digital data signal from a data input terminal 111 and outputs it to the signal processing circuit 102, an out-of-sync detector circuit 104 for detecting, from the first and second clock signals, a deviation of sampling frequency between the first and second digital data signals, a jitter detection circuit 105 for detecting an amount of jitter between the first and second clock signals, and a data interpolation circuit 106 for interpolating data of one (in this embodiment, the second digital data signal) of the first and second digital data signals on the basis of the deviation of the sampling frequency detected by the out-of-sync detector circuit 104 and controlling an amount of interpolation (the number of samples) on the basis of the amount of jitter detected by the jitter detection circuit 105.

The signal processing circuit 102 compresses and encodes a PCM signal (audio data) of 128 kbps as, for example, the second digital data signal input from the data input terminal 111 through the second buffer 103 according to a high-efficiency audio signal coding system (for example, Conjugate Structure and Algebraic Code Excited Linear Prediction (CS-ACELP) system), outputs a resultant coded data as the first digital data signal to the data output terminal 108 through the first buffer 101, extends and decodes the coded data input from the data input terminal 107 through the first buffer 101 and outputs a resultant decoded PCM signal of 128 kbps to the data output terminal 110 through the second buffer 103.

The out-of-sync detector circuit 104 detects the phase deviation between the first and second clocks CLK1 and CLK2 by counting one of the first and second clocks CLK1 and CLK2 with an interval preset by using the other as a reference.

The jitter detection circuit 105 detects an amount of jitter by counting one of the first and second clocks with an interval preset by using the other as a reference and comparing the count with an average value of the past count for a long time.

The data interpolation circuit 106 accumulates the deviation of the sampling frequency detected by the out-of-sync detection circuit 104 and does not perform data interpolation when the accumulated value is smaller than the amount of jitter detected by the jitter detector circuit 105. On the other hand, only when the accumulated value becomes equal to or larger than the amount of jitter, the data interpolation circuit 106 initializes the accumulated value to 0 and performs a data interpolation with an interpolation data amount which is a sum of the jitter amount and a data amount corresponding to one sample. Incidentally, the data interpolation may be performed by either of the following two methods: A first method is to add 0 data when a read-out data is short and to delete data when the read-out data is excessive. A second method is to interpolate by down-sampling after over-sampling, as in the conventional system.

The second buffer 103 receives the PCM signal which is the decoded data from the signal processing circuit 102 and sends it to the data interpolation circuit 106. The data interpolation circuit 106 interpolates data of the PCM signal and sends it to the second buffer 103 again. The second buffer 103 outputs the PCM signal from the data input terminal 111 to the data interpolation circuit 106. The data interpolation circuit 106 interpolates the data of the PCM signal and supplies it to the second buffer 103 again. The second buffer 103 outputs it to the signal processing circuit 102 in synchronism with the second clock signal CLK2.

According to the present invention, since the amount of data interpolation is controlled on the basis of the amount of jitter between the clock signals, when the data interpolation is to be performed in order to prevent the data slip due to the deviation between the two or more sampling frequencies from occurring, the data interpolation in the vicinity of the timing in which the data slip occurs is not performed even if there is a jittered sampling frequency, contrary to the conventional system. Therefore, the problems of data discontinuity which is caused by such unnecessary (erroneous) data interpolation and noise due to the discontinuity of data can be solved by the present invention.

What is claimed is:

1. A digital signal processor comprising:
signal processing means for transforming a first digital data signal into a second digital data signal;
first buffer means driven by a first clock signal for temporarily storing the first digital data signal and supplying the first digital data signal to said signal processing means;
second buffer means driven by a second clock signal independent from the first clock signal for temporarily storing the second digital data signal output from said signal processing means;
out-of-sync detector means for detecting, from the first and second clock signals, a deviation of sampling frequency between the first and second digital data signals;

jitter detection means for detecting an amount of jitter between the first and second clock signals; and data interpolation means for interpolating data of one of the first and second digital data signals on the basis of the deviation of the sampling frequency detected by said out-of-sync detector means and controlling an amount of interpolation on the basis of the amount of jitter detected by said jitter detection means.

2. A digital signal processor as claimed in claim 1, wherein said data interpolation means accumulates the deviation of the sampling frequency detected by said out-of-sync detection means and does not perform data interpolation when the accumulated value is smaller than the amount of jitter and does perform data interpolation by a data amount which is a sum of the jitter amount and a data amount corresponding to one sample and initializes the accumulated value when the accumulated value is equal to or larger than the amount of jitter detected by said jitter detection means.

3. A digital signal processor as claimed in claim 1, wherein said out of-sync detection means detects the phase deviation between the clocks as a deviation of the sampling frequency by counting one of the first and second clocks with an interval preset by using the other as a reference and said jitter detection circuit detects an amount of jitter by counting one of the first and second clocks with an interval preset by using the other as a reference and comparing the count with an average value of the past count for a long time.

4. A digital signal processor as claimed in claim 1, wherein said signal processing means, said first buffer means and said second buffer means are bi-directionally operable and transforms the first digital data signal and the second digital data signal mutually.

* * * * *